April 16, 1957
S. T. FARACE
2,788,735
COOKER FOR CYLINDRICAL FOOD ARTICLES
Filed Nov. 26, 1954
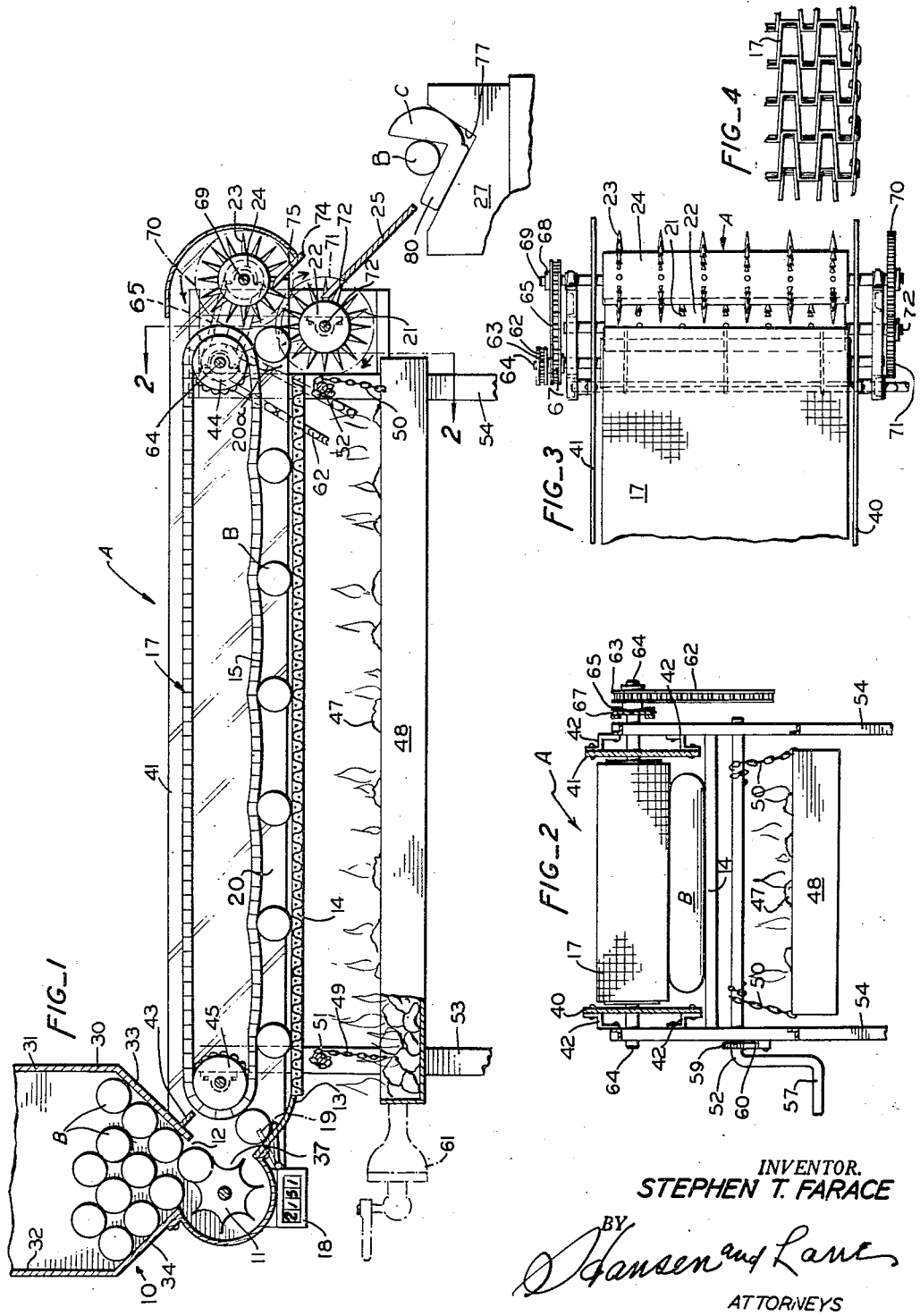
INVENTOR.
STEPHEN T. FARACE
BY Hansen and Lane
ATTORNEYS

2,788,735

COOKER FOR CYLINDRICAL FOOD ARTICLES

Stephen T. Farace, Santa Clara, Calif.

Application November 26, 1954, Serial No. 471,149

4 Claims. (Cl. 99—443)

The present invention relates to a cooking mechanism, and pertains more particularly to a device for grilling generally cylindrical meat products such as wieners or frankfurters.

Many restaurants, lunch counters and concessions make a specialty of cooking and serving fried or grilled wiener or frankfurter sandwiches. During busy periods it is extremely desirable to be able to prepare the sandwiches at a rapid rate and in a sanitary manner, and to be sure that the money in payment therefor is received and deposited in the cash register for each of the sandwiches dispensed.

In establishments in which such food products are sold, it frequently occurs that a single person will be called upon to do both the cooking and serving, and also to handle the money involved. Under such conditions accurate accounting on the part of the employee may be extremely difficult, and frequently an employer may feel that the employee is dishonest without being able to prove it. It is certain that at times dishonest practices are indulged in on the part of such an employee, while at other times failure to make accurate accounting may be due simply to the employee's inability to remember to collect and deposit in the cash register the money received for each food item sold.

The present invention involves a high production, sanitary mechanism for grilling frankfurter or wiener type food articles, whereby the food articles are machine counted as they are fed into the cooking portion of the mechanism, and are conveyed along at a predetermined speed over a cooking grill while being rotated about their longitudinal axes, and at the termination of the cooking process are carried from the cooking surface, are tenderized by being lacerated, and then are deposited in an opened bun ready to be eaten.

The invention further provides an improved and simplified cooker for cylindrical type food products such as wieners and frankfurters, wherein the only source of ingress to the cooking zone of the machine is through a counter-equipped feed mechanism.

These and other objects and advantages of the invention will be apparent from the following description and the accompanying drawing, wherein:

Fig. 1 is a longitudinal sectional view through a machine embodying the present invention showing a plurality of food articles in a storage hopper, and showing additional food articles in various stages of progress through the machine.

Fig. 2 is a vertical, transverse sectional view taken along line 2—2 of Fig. 1.

Fig. 3 is a fragmentary plan view showing the discharge end of the machine illustrated in Figs. 1 and 2.

Fig. 4 is a fragmentary plan view in enlarged scale of a portion of a conveyor belt incorporated in the machine shown in Figs. 1, 2 and 3.

In general, the cooking mechanism A shown in Figs. 1, 2 and 3 comprises a hopper 10 at the entrance end of the machine adapted to receive a supply of cylindrical food articles B such as frankfurters or wieners. A fluted feed roller 11 is journaled beneath a discharge slot 12 at the bottom of the hopper 10 to pass the food articles B one at a time from the hopper onto an inclined plate 13 whence they roll by gravity onto a cooking grill 14 beneath the lower run 15 of a conveyor belt 17. A counting mechanism 18 is mounted with an actuating lever arm 19 thereof positioned to be engaged and actuated by the passage of each article B as it is fed by the feed roller into the cooking zone 20.

From the discharge end 20a of the cooking zone 20 each food article B is pierced by radially projecting spikes 21 of a lower spiked roller 22 which is rotated in the direction of the arrows in Fig. 1 to carry the article B upwardly against the spikes 23 of an upper spiked roller 24. The spikes 21 and 23 of both rollers 22 and 24 are arranged in circumferential rows which are offset from each other axially of the rollers so that each row of spikes 21 of the upper roller 22 are located midway between adjacent rows of spikes 23 of the lower roller 24. The rollers 22 and 24 are mounted in axially parallel relation, and are arranged sufficiently close together so that the spikes of both rollers are driven into each food article passed therebetween so as to almost overlap within the article.

Thus, each spike as it is driven well into the food article is swung transversely through a portion of the article as the latter is carried through between the two spiked wheels, each spike tearing an arcuate gash in the article. The cooked and internally lacerated food articles then are discharged onto an inclined stripper plate 25 down which they roll by gravity into a bun C placed in a notched receptacle 27 to receive them.

Referring to the details of the mechanism A shown in Figs. 1, 2 and 3, the food hopper 10 is of a length to receive a supply of the wieners or frankfurters B of a predetermined size in axially parallel relation therein. The hopper 10 preferably has a large upper portion 30 with vertical upper side walls 31 and 32 and inclined lower side walls 33 and 34. The lower edges of the sloping side walls 33 and 34 are separated by the discharge gap 12 of a size to pass the food articles B in the hopper 10 one at a time therethrough.

The fluted feed roller 11 is formed with a plurality of lengthwise extending grooves 37 symmetrically formed about the periphery thereof. Each groove 37 is of a size to receive the lowermost food article B in the hopper 10 in seated condition therein. As the feed roller 11 is rotated one step at a time, the lowermost food article B seated in the feed roller is discharged onto the sloping apron 13, and actuates the arm 19 of the counter 18 to advance the counter by one digit.

Since the counter actuating arm 19 is operated by engagement with the food article itself, and not by the rotation of the feed roller 11, there is no danger that an article will be counted unless it actually is fed into the cooking zone.

A pair of side panels 40 and 41, which may be of heat resistant glass so that the cooking process may be observed by the customers, are mounted, one on each side of the machine on brackets 42 (Fig. 2). These side panels 40 and 41 are mounted sufficiently close to the grill 14 and to the side edges of the conveyor belt 17 so as to prevent the insertion of food articles B therebetween. The side panels 40 and 41 extend the full length of the machine, across the ends of the feed roller 11, and alongside the sloping feed apron and the lower portion of the hopper 10. A guard plate 43 is mounted on the sloping lower hopper wall 33, and extends downwardly toward the conveyor belt 17 to prevent the insertion of an article B through the space between the hopper 10 and the conveyor belt.

Thus it would be impossible for an attendant, without dismantling the machine, to feed a food article B into the cooking zone 20 between the grill 14 and the lower run 15 of the conveyor belt 17, except through the hopper 10 and past the counter 18.

The conveyor belt 17 preferably is of metal link or mesh construction, for example as shown in Fig. 4, so as not to be damaged by the heat of cooking, and is of a width somewhat greater than the length of the articles B to be rolled therebeneath through the cooking zone 20.

The conveyor belt 17 is passed around a power driven, toothed roller 44 and an idler roller 45 with the lower run 15 of the rollers disposed at a height above the grill to engage an article B therebeneath. The belt preferably is slightly slack as shown in Fig. 1, so that the lower run 15 thereof will drape slightly and rest lightly on each article B, thereby to frictionally engage the article and roll it along over the grill as the conveyor belt is driven to move the lower run 15 thereof in the direction of the arrow in Fig. 1. The belt 17 is driven at a speed adjusted to allow proper cooking time for each food article B as it traverses the cooking zone 20.

Heat for cooking the food articles B as they are rolled along the grill 14 by the conveyor belt 17 is supplied by suitable heating means such as, for example, burning charcoal 47 or other suitable fuel in a fire box 48 suspended by chains 49 and 50 (Figs. 1 and 2) from crank shafts 51 and 52 respectively. The shafts 51 and 52 are journaled on support legs 53 and 54 (Fig. 1) respectively. The fire box support shafts 51 and 52 are provided with crank throws 57, and each crank shaft is provided with a ratchet wheel 59 (Fig. 2) and pawl 60 for retaining the fire box 48 at a desired adjusted distance below the grill 14. If desired, burners for employing other suitable fuels, may be provided. As an example of one such of other type of burner, a conventional type of gas burner 61 is indicated in broken lines in Fig. 1.

For driving the conveyor belt 17 and the spiked rollers 22 and 24, a first drive chain 62 is passed around a sprocket wheel 63 on the shaft 64 of the conveyor belt roller 44. The chain 62 is driven at a controlled speed by a suitable prime mover such as an electric motor, not shown.

A second drive chain 65 is passed around a pair of sprockets 67 and 68 secured one to the belt roller shaft 64 and the other to the shaft 69 of the upper spiked roller 24. The lower spiked roller 22 is driven in a reverse direction from that of the upper spiked roller 24 by a pair of meshed gears 70 and 71 secured one to shaft 69 of the upper spiked roller 24, and one to the shaft 72 of the lower spiked roller 22.

The speed of the conveyor belt 17 is so timed that each food article B will be fully cooked by the time it completes its rolling progress through the cooking zone 20 and reaches the terminal end portion 20a thereof. At this latter stage of its progress, the spikes 21 of the lower spiked roller 22 pierce the article B and carry it upwardly and outwardly toward the upper spiked roller 24. The spiked rollers 22 and 24 are positioned sufficiently close together so that as each food article B passed between them the spikes 21 and 23 of both rollers will penetrate well into the article. The opposite rotative movement of the two spiked rollers causes each spike to be swung transversely within the article B, lacerating the ground meat with which the article is stuffed, and also tending to tear the casing (not shown) of the article B when such is present. These lacerations have the effect of tenderizing the article, making it easier to bite off sections thereof along the planes of the lacerations. They also facilitate chewing the article.

As each article B, cooked and tenderized by the lacerating action of the spiked rollers emerges from between the spiked rollers 22 and 24, the article is engaged by an upper stripping plate 74, which is provided with slots 75 to provide clearance for the rows of spikes 23 in the upper roller 22. The upper stripping plate 74 is disposed substantially tangent to the periphery of the roller 22 so as to strip the article B off the spikes 23 of the upper roller.

The similarly slotted lower stripping plate 25 is fitted in a similar manner between the rows of spikes 21 of the lower roller 22 to strip the article B from the spikes 21. Thence the article rolls by gravity down the inclined lower stripping plate 25. A notched recess 77 is provided in the bun support member 27 to support an opened bun C (Fig. 1) with its lower half 80 positioned to receive the article B thereon.

The attendant then may pick up the completed sandwich D, consisting of the bun C with the food article B in it, for serving to a customer.

By replenishing the supply of the food articles B in the hopper 10 as required, and by feeding the articles at desired intervals by means of the feed roller 11 into the cooking zone 20, each successive article will be properly cooked, tenderized by the lacerations of the spiked rollers, and inserted in a bun placed to receive it without further action on the part of the attendant.

From the time the attendant inserts the articles B in the hopper 10 until he hands the completed sandwich D to a customer, it is unnecessary, and in fact is virtually impossible for the attendant to touch the article. Therefore, if the attendant uses a paper napkin to pick up the completed sandwich D, the customer is very apt to be impressed by the sanitary conditions surrounding the preparation of the sandwich.

Use of the present mechanism also greatly facilitates the collection of money by the attendant for each sandwich served, since it is not necessary that the attendant be diverted by any other factors usually incidental to the cooking of such articles. Use of the present mechanism also stimulates the attendant to collect and deposit cash for each sandwich dispensed since he knows that the counter 18 will present an accurate picture of the number of food articles which have passed through the machine during his tour of duty.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A machine for cooking cylindrical food articles of substantially uniform diameter such as wieners comprising a hopper for storing a supply of the articles, a cooking grill mounted adjacent said hopper, a conveyor belt mounted with a run thereof extending longitudinally above the grill and spaced therefrom to have rolling engagement with articles to be cooked on the grill, drive means mounted to drive the conveyor belt to move said run thereof in a predetermined direction, feed means mounted to feed individual articles from the hopper onto the grill beneath the belt for rolling movement by the belt along said grill, a pair of axially parallel spiked rollers mounted to receive each article therebetween at a predetermined point along said grill, a plurality of spikes projecting radially from each roller at closely spaced intervals, the points of the spikes on adjacent sides of said rollers being separated by a distance less than the diameter of the articles to be cooked, means for driving the spiked rollers in opposite directions to seize each article arriving at said point and pass it between said rollers, and stripping means mounted on the discharge side of the spiked rollers to strip the articles from the spikes.

2. A machine for cooking cylindrical food articles of substantially uniform diameter such as wieners comprising a hopper for storing a supply of the articles, a cooking grill mounted laterally adjacent said hopper, a conveyor belt mounted with a lower run thereof extending longitudinally above the grill and spaced therefrom to have rolling engagement with articles to be cooked on the grill, drive means mounted to drive the conveyor belt to move the lower run thereof in a predetermined direction, feed means mounted to feed individual articles from the hopper onto the grill beneath the belt for rolling movement by the belt in a predetermined path along said grill, a counting mechanism mounted for actuation by each article as it is fed by said feed means onto the grill, a pair of axially parallel spiked rollers mounted to receive each article therebetween at a predetermined point along said grill, means for driving the spiked rollers in opposite directions to pass each article between said rollers, stripping means mounted on the discharge side of the spiked rollers to strip the articles from the spiked rollers, and enclosure means mounted to closely enclose the path traversed by the articles from the feed means to the spiked rollers to prevent the insertion of one of said articles into said path except through the feed means.

3. A machine for cooking cylindrical food articles such as wieners comprising a hopper for storing a supply of the articles, feed means for discharging articles from said hopper one at a time, a cooking grill mounted to receive articles discharged by said feed means, a conveyor belt mounted with a run thereof disposed over said grill to define a cooking zone between the belt run and the grill, drive means mounted to drive said belt run to roll articles discharged by the feed means through the cooking zone on said grill, heating means mounted to cook the articles as they are rolled through the cooking zone, a pair of axially parallel spiked rollers mounted at the terminal end of the cooking zone with their axes disposed transversely to the direction of travel of said belt run, means for driving the spiked rollers in opposite directions to seize each article as it reaches the terminal end of the cooking zone and pass it between said rollers, each of said spiked rollers having a plurality of radially projecting spikes thereon, the axes of the two rollers being spaced apart by a distance sufficient to drive the spikes of the two rollers into each article passing therebetween to a substantial depth, whereby the teeth of the two rollers will be swung internally of the article to lacerate and thus tenderize it, stripping means mounted on the discharge side of the spiked rollers, and bun supporting means mounted in a position to receive each cooked and tenderized article stripped from the rollers.

4. A machine for cooking cylindrical food articles such as wieners comprising a hopper for storing a supply of the articles, feed means for discharging articles from said hopper one at a time, a cooking grill mounted to receive articles discharged by said feed means, a metal conveyor belt of open link construction mounted with a lower run thereof disposed over said grill to define a cooking zone between the belt run and the grill, the belt being sufficiently loose to drape downwardly centrally of said run, drive means mounted to drive said belt run to roll articles discharged by the feed means through the cooking zone on said grill, heating means mounted to cook the articles as they are rolled through the cooking zone, a pair of axially parallel spiked rollers mounted at the terminal end of the cooking zone to receive therebetween each article rolled through the cooking zone, means for driving the spiked rollers in opposite directions to seize each article and pass it between said rollers, each of said spiked rollers having a plurality of circumferential rows of radially projecting spikes thereon, the spike rows of one roller being offset axially from the spike rows of the other roller, the axes of the two rollers being spaced apart by a distance to position the points of adjacent spikes of the two rollers substantially closer to each other than the diameter of the articles to be cooked to cause the spikes to penetrate each article passing between the rollers to a substantial depth, and to swing the spikes transversely in article penetrating condition, thereby to lacerate and thus tenderize the article, stripping means mounted on the discharge side of the spiked rollers, and means for supporting an opened bun in position to receive each cooked and tenderized article stripped from the rollers.

References Cited in the file of this patent

UNITED STATES PATENTS

| | | |
|---|---|---|
| 2,244,670 | Benedict | June 10, 1941 |
| 2,606,341 | Dolan | Aug. 12, 1952 |